(12) United States Patent
Berry et al.

(10) Patent No.: US 9,218,675 B2
(45) Date of Patent: Dec. 22, 2015

(54) PRESENTING MULTIPLE MAP RESULTS WITH ON-MAP LABELS

(71) Applicants: Alex Berry, Sydney (AU); Robert Bowmaker, Sydney (AU)

(72) Inventors: Alex Berry, Sydney (AU); Robert Bowmaker, Sydney (AU)

(73) Assignee: GOOGLE INC., Mountain View, CA (US)

( * ) Notice: Subject to any disclaimer, the term of this patent is extended or adjusted under 35 U.S.C. 154(b) by 328 days.

(21) Appl. No.: 13/789,239

(22) Filed: Mar. 7, 2013

(65) Prior Publication Data
US 2015/0187100 A1 Jul. 2, 2015

(51) Int. Cl.
*G06T 11/20* (2006.01)
*G06T 11/60* (2006.01)
*G06F 17/30* (2006.01)
*G01C 21/32* (2006.01)

(52) U.S. Cl.
CPC ............. *G06T 11/20* (2013.01); *G06T 11/60* (2013.01); *G01C 21/32* (2013.01); *G06F 17/30241* (2013.01)

(58) Field of Classification Search
None
See application file for complete search history.

(56) References Cited

U.S. PATENT DOCUMENTS

2005/0251331 A1* 11/2005 Kreft .............................. 701/207
2008/0253663 A1* 10/2008 Gotoh et al. ................. 382/225
2009/0055087 A1* 2/2009 Beacher ........................ 701/200
2011/0047509 A1* 2/2011 Arrasvuori ................... 715/815
2012/0105474 A1* 5/2012 Cudalbu et al. .............. 345/633
2014/0074395 A1* 3/2014 Brown .......................... 701/424

OTHER PUBLICATIONS

"Introduction to Marker Clustering with Google Maps," (2014). Retrieved from the Internet at URL:http://www.appelsiini.net/2008/introduction-to-marker-clusterina-with-google-maps.
Ben McEvoy, "Clustering Results with Windows Phone Bing Map Control," (2012). Retrieved from the Internet at URL:http://benmcevoy.com.au/blog/clustering-results-with-windows-phone-bing-map-control.
Stackoverflow, "Google Maps v2: How to Display Various Markers with the Same Coordinates," (2014). Retrieved from the Internet at URL:http://stackoverflow.com/questions/10508398/google-maps-v2-how-to-display-various-markers-with-the-same-coordinates.

* cited by examiner

*Primary Examiner* — Tize Ma
(74) *Attorney, Agent, or Firm* — Marshall, Gerstein & Borun LLP (57) ABSTRACT

Client-side and server-side methods for displaying points of interest (POIs) within a map displayed on a client computing device are presented. In an example, the method includes transmitting a request for map data and receiving, in response, map data and POI data related to the request. The method further includes filtering POIs in the POI data to determine one or more sets of POIs wherein each POI in any set of POIs is within a predetermined distance from the other POIs in the set. The method includes creating a merged icon for the set of POIs, the merged icon comprising a collection of layered icons and creating a merged, multi-line label for the set of POIs, wherein each label is associated with a corresponding one POI in the set. The method also includes displaying, for each set of POIs, the merged icon adjacent to the merged, multi-line label.

26 Claims, 8 Drawing Sheets

PRESENTING MULTIPLE MAP RESULTS WITH ON-MAP LABELS

FIELD OF TECHNOLOGY

The present disclosure relates to displaying points of interest on a map rendered by a mapping application running on a computing device and more specifically to a system and a method for presenting multiple map results with on-map labels for viewing on the computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

On a map with points of interest (POIs) such as businesses, homes, landscapes, and advertisements, POIs can be labeled directly to provide information about the POIs such as the name, description, contact info, etc. The exact position of the POI may be indicated with a marker, and the extra information can be displayed next to this point in a label. Information may also be indicated through the marker style chosen. If two points are indistinguishably close together, or in the same location in the data from which the map is built (for example, two businesses located in a multi-story building or a business and an advertisement for the business specified at the same location), then the two markers showing exact position will overlap. In some systems, labels which overlap are handled by dropping one of the locations and its label, creating a map with inaccurate data and/or missing points.

SUMMARY

A distance filter may determine if two or more POIs should be merged together. For example, if two POIs are less than N pixels apart, the two POIs may be treated as a single point or icon cluster and the labels may be merged into a multi-label cluster. Each label in the multi-label cluster may correspond to one POI and the labels may be displayed on top of one another to form an ordered list. Depending on the number of labels in the multi-label cluster, labels may be omitted from the list starting from the bottom. A stem may connect each label in the multi-label cluster to the icon cluster.

A label may be highlighted when a hover event occurs over the label and allow a selection of one distinct point of interest in the multi-label cluster. The corresponding icon in the icon cluster may also become a selectable target to allow a selection of one distinct point of interest in the icon cluster. If a label or icon is selected, the corresponding label may expand, displaying more information about the POI and the non-selected POIs may be hidden and no longer viewable on the map.

In accordance with an example of the present disclosure, a computer-implemented method for displaying points of interest (POIs) within a map that is displayed on a client computing device is presented. The computer-implemented method includes transmitting to a server device, via a computer network, a request for map data and receiving, from the server device in response to the request, map data corresponding to the request and point of interest (POI) data related to the request. The computer-implemented method further includes filtering, with the client computing device, POIs in the POI data to determine one or more sets of POIs wherein each POI in any set of POIs is within a predetermined distance from the other POIs in the set of POIs. The computer-implemented method also includes creating with the client computing device, for each set of POIs, a merged icon for the set of POIs, the merged icon comprising a collection of layered icons and creating with the client computing device, for each set of POIs, a merged, multi-line label for the set of POIs, wherein each label in the merged, multi-line label is associated with a corresponding one POI in the set of POIs. The computer-implemented method also includes displaying on a map generated from the received map data, for each set of POIs, the merged icon adjacent to the merged, multi-line label.

In accordance with another example of the present disclosure, another computer-implemented method for determining points of interest (POIs) within a map to be displayed on a client computing device is provided. The computer-implemented method includes receiving, via a computer network, a request for map data and determining, at a server device, that one or more points of interest correspond to the map data request. The computer-implemented method further includes retrieving, from a database, map data corresponding to the request and point of interest (POI) data relating to the request and filtering, with the server device, POIs in the POI data to determine one or more sets of POIs wherein each POI in any set of POIs is within a predetermined distance from the other POIs in the set of POIs. The computer-implemented method also includes creating within the server device, for each set of POIs, a merged icon for the set of POIs, the merged icon comprising a collection of layered icons and creating within the server device, for each set of POIs, a merged, multi-line label for the set of POIs, wherein each label in the merged, multi-line label is associated with a corresponding one POI in the set of POIs. The computer-implemented method also includes transferring to the client device the retrieved map data and POI data, the merged icon, and the merged, multi-line label.

In an accordance with another example of the present disclosure, a computer-readable storage medium storing instructions, executable by a processor of a client device, for displaying on the client device points of interest (POIs) within a map is presented. The computer-readable storage medium includes executable instructions to cause the processor to transmit to a server, via a computer network, a request for map data and receive, from the server in response to the request, map data corresponding to the request and POI data related to the request. The computer-readable storage medium also includes executable instructions to cause the processor to filter POIs in the POI data to determine one or more sets of POIs wherein each POI in any set of POIs is within a predetermined distance from the other POIs in the set of POIs. The computer-readable storage medium further includes executable instructions to cause the processor to create a merged icon for each set of POIs, the merged icon comprising a collection of layered icons and create a merged, multi-line label for each set of POIs, wherein each label in the merged, multi-line label is associated with a corresponding one POI in the set of POIs. The computer-readable storage medium also includes executable instructions to cause the processor to display on a map generated from the received map data, for each set of POIs, the merged icon adjacent to the merged, multi-line label.

In an accordance with another example of the present disclosure, a computer-readable storage medium storing instructions, executable by a processor of a server device, for displaying on the client device points of interest (POIs) within a map is presented. The computer-readable storage medium includes executable instructions to cause the processor to receive, via a computer network, a request for map data and determine that one or more POIs correspond to the map data request The computer-readable storage medium also includes executable instructions to cause the processor to retrieve, from one or more databases storing map data and POI data, map data corresponding to the request and POI data relating to the request, wherein the POI data include, for each POI, a ranking of the POI and a label associated with the POI and filter POIs in the POI data to determine one or more sets of POIs wherein each POI in any set of POIs is within a predetermined distance from the other POIs in the set of POIs The computer-readable storage medium further includes executable instructions to cause the processor to create, for each set of POIs, a merged icon for the set of POIs, the merged icon comprising a collection of layered icons and create, for each set of POIs, a merged, multi-line label, wherein each label in the merged, multi-line label is associated with a corresponding one POI in the set of POIs. The computer-readable storage medium also includes executable instructions to cause the processor to transfer to the client device the retrieved map data and POI data, the merged icon, and the merged, multi-line label.

In accordance with another example of the present disclosure, an apparatus for displaying on the client device points of interest (POIs) within a map is presented. The apparatus includes a server device to receive via a computer network, a request for map data. The apparatus also includes a POI module to determine that one or more POIs correspond to the map data request and retrieve, from one or more databases storing map data and POI data, map data corresponding to the request and POI data relating to the request, wherein the POI data include, for each POI, a ranking of the POI and a label associated with the POI. The apparatus also includes the POI module to filter POIs in the POI data to determine one or more sets of POIs wherein each POI in any set of POIs is within a predetermined distance from the other POIs in the set of POIs and create, for each set of POIs, a merged icon for the set of POIs, the merged icon comprising a collection of layered icons. The apparatus further includes the POI module to create, for each set of POIs, a merged, multi-line label, wherein each label in the merged, multi-line label is associated with a corresponding one POI in the set of POIs and transfer to the client device the retrieved map data and POI data, the merged icon, and the merged, multi-line label.

In accordance with another example of the present disclosure, another apparatus for displaying on the client device points of interest (POIs) within a map is presented. The apparatus includes a client device to transmit to a server, via a computer network, a request for map data and receive, from the server in response to the request, map data corresponding to the request and POI data related to the request. The apparatus also includes a POI module to filter POIs in the POI data to determine one or more sets of POIs wherein each POI in any set of POIs is within a predetermined distance from the other POIs in the set of POIs and create a merged icon for each set of POIs, the merged icon comprising a collection of layered icons. The apparatus further includes the POI module to create a merged, multi-line label for each set of POIs, wherein each label in the merged, multi-line label is associated with a corresponding one POI in the set of POIs and display on a map generated from the received map data, for each set of POIs, the merged icon adjacent to the merged, multi-line label.

The figures depict one embodiment of the present invention for purposes of illustration only. One skilled in the art will readily recognize for the following discussion that alternate embodiments of the structures and methods illustrated herein may be employed without departing from the principles of the invention described herein.

DETAILED DESCRIPTION

Figure 1:
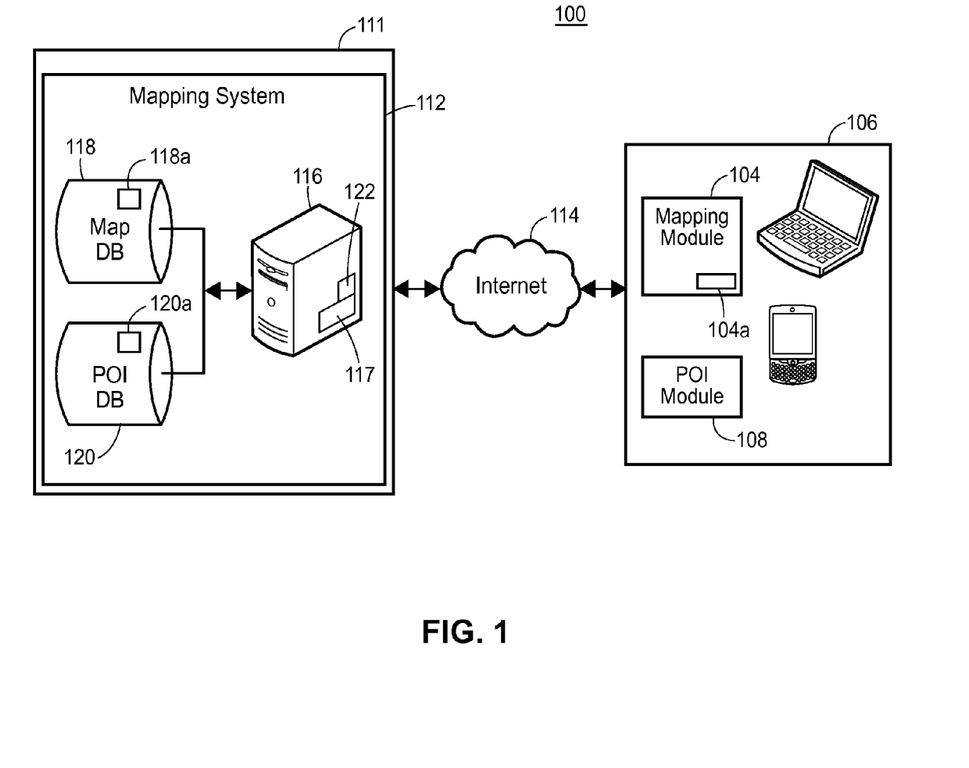
FIG. 1 is a high-level block diagram of a system for presenting multiple map results with on-map labels in a mapping system.

FIG. 1 is a high-level block diagram that illustrates a system 100 for presenting multiple map results with on-map labels. The system 100 may include a computing device 106 that is capable of executing the mapping module 104, a points of interest (POI) module 108, and/or other modules that allow the device 106 to retrieve POIs for display on a computing device 106. In some embodiments, the device 106 executes instructions of the mapping module 104 and the POI module 108. The device 106 may be a personal computer, smart phone, tablet computer, smart watch, head mounted display (HMD), or other computing device capable of executing the various modules, instructions, etc., described herein. The mapping module 104 and POI module 108 may communicate with backend components 111 including a mapping system 112 through the Internet 114 or other type of network (e.g., LAN, a MAN, a WAN, a mobile, a wired or wireless network, a private network, or a virtual private network, etc.).

A mapping system server 116 may send and receive data for the mapping module 104. In some embodiments, the mapping system 112 and mapping server 116 may send computer-executable instructions and data to allow the mapping module 104 to render a digital map in a display component of the computing device 106. In some embodiments, the mapping server 116 may include a module 117 to receive location data from computing device 106, results of an analysis by the mapping system 116, or other data and, in return, send map data 118a.

In some embodiments, the mapping module 104 may send data to the backend components 111. The mapping module 104 may send location data from a GPS receiver of the computing device 106 to the mapping system 112. Device location data may generally include any data generated or received by an application executing on the mobile computing device 106 that indicates a geographic location (e.g., a user's current or future location, a planned location, location preferences, etc.). In some embodiments, the device activity data includes one or more of a history file corresponding to a log of web page requests, locations, flight information, e-mail discussions, and social networking profile information. The geographic location data may include one or more of a city name, an address, an airport code, global positioning system coordinates, etc.

In situations in which the systems discussed here collects personal information about users, or may make use of personal information, the users may be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the mapping system.

The mapping module 104 may include computer-executable instructions to allow the mapping module 104 to render a digital representation of a user's current geographic location or any other geographic location in a display component of the computing device 106. As part of the rendering process (e.g., when the user executes the mapping module 104, conducts a geographic location search using the mapping module 104, etc.), the mapping module 104 may execute instructions to display a mapping interface 104a including map data 118a from a map database 118 and POI data 120a from a POI database 120. The mapping interface 104a may allow a user to cause the device 106 to render various digital representations of geographic locations using map data 118a, from the mapping system 112, or other map data sources.

The POI module 108 or various other modules of the computing device 106 may include computer-executable instructions to gather POI data 120a or various other data. In some embodiments, the computing device 106 may store POI data 120a from a variety of other modules executing on the computing device 106 or in communication with the computing device 106 (e.g., a web browser, a user activity tracking module, a trip planning module, an email module, etc.). The POI 108 may also include instructions to send POI data 120a to the client computing device 106 for analysis.

In some embodiments, the POI module 108 at the client device 106 may receive, send, and analyze POI data 120a that is displayed at the computing device 106 using the mapping module 104. In some embodiments, the module 108 includes instructions to analyze POI data 120a including a history of web browser searches, trips planned via a trip planning application executing on the device 106, e-mail data, social networking data, or other data that may include indications of geographical locations the user has specified. Analysis of the POI data 120a by the POI module 108 at the client mobile computing device 106 may include computer-executable instructions to determine location data that the module 108 may send to the mapping system 112.

In other embodiments, the mapping system 112 may include a mapping server 116 at the backend 111 that includes a mapping module 117 to receive, send, and analyze map data requests from computing device 106 for determining relevant map data 118a that is transmitted to the computing device 106. In some embodiments, the map server 116 stores the map data 118a in one or more data repositories, such as map database 118. Map module 117 may include computer-executable instructions to analyze the map data 118a and/or other data stored in the data repositories. The mapping server 116 may also include a POI module 122 to receive, send, and analyze map data requests from computing device 106 and/or map data 118a for determining relevant POI data 120a that may be transmitted to the computing device 106. In some embodiments, the map server 116 stores the POI data 120a in one or more data repositories, such as POI database 120. Map module 122 may include computer-executable instructions to analyze the map data 118a, POI data 120a and/or other data stored in the data repositories.

Figure 2A:
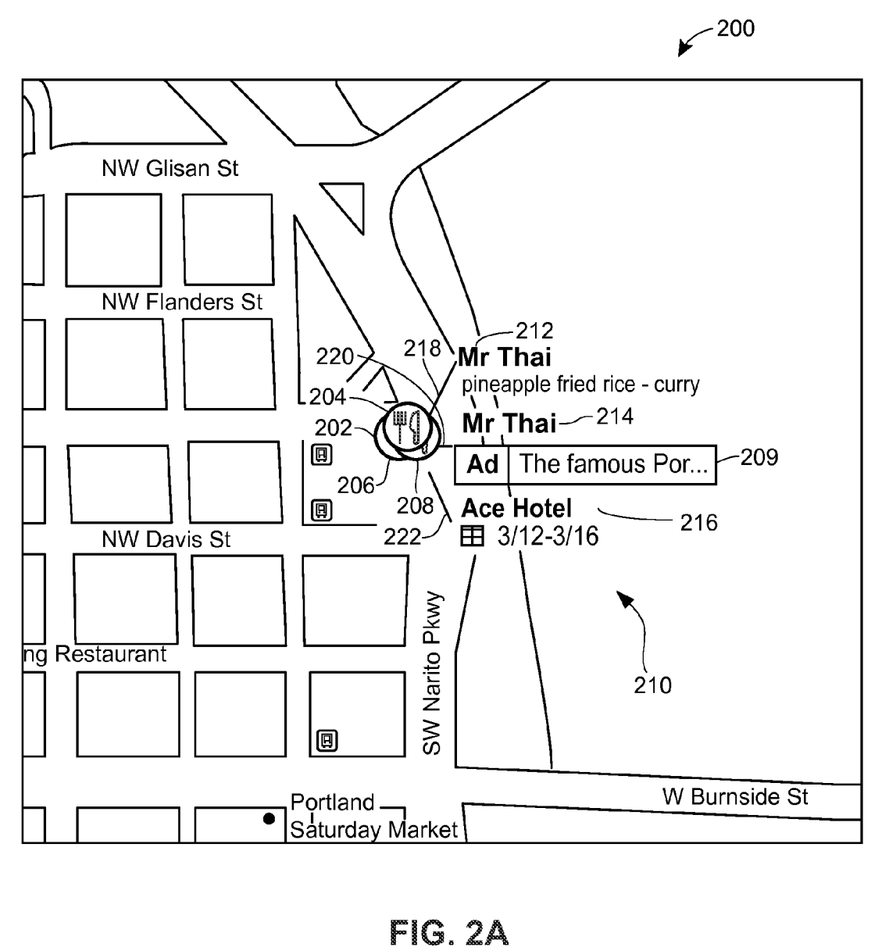
FIGS. 2A-C are illustrations of exemplary maps rendered by the system for presenting multiple map results with on-map labels.

FIG. 2A illustrates a map 200. The processor of a computing device, such as the client computing device 106 illustrated in FIG. 1, may execute an instruction to render the map 200 within a viewport of a mapping application 104a. The computing device 106 may receive map data and/or POI data (such as the map data 110a and/or the POI data 120a illustrated in FIG. 2) and the processor of the computing device 106 may execute an instruction to render visual representations of the POI data 120a as a layer on the map 200, as a label on a map 200, or may render visual representations of the POI data 120a directly on the map 200, etc.

FIG. 2A illustrates an icon cluster 202 including a first icon 204, a second icon 206 and a third icon 208. Each icon in the icon cluster 202 may visually represent the location of a POI on the map 200. Although the icon cluster 202 in FIG. 2A consists of three icons, the icon cluster 202 may have any number of icons. Additionally, the icon cluster 202 may visually represent the location of two or more POIs on the map 200 which may be within a certain defined distance from each other. In some embodiments, one or more of the POIs may be an advertisement 209, such as an advertisement for one of the POIs in the icon cluster 202. In some embodiments, the processor may execute an instruction to render the icon cluster 202 in a triangle pattern, with the first icon 204 on top, the second icon 206 in the middle and the third icon 208 on the bottom. In some embodiments, the instruction executed by the processor may render the icon cluster 202 using other patterns or methods. In some embodiments, a single marker may represent two or more POIs.

FIG. 2A also illustrates a multi-label cluster 210, which is a user interface (UI) element that consists of two or more labels, wherein each label in the multi-label cluster 210 corresponds to one POI. For example, the multi-label cluster 210 on the map 200 includes a first label 212, a second label 214 and a third label 216. Although the multi-label cluster 210 depicted in FIG. 2A is displayed with each label on top of the other in a list format, other patterns or methods of displaying the multi-label cluster 210 may be used. In some embodiments, the POIs in the multi-label cluster 210 may be ordered by rank, though in other embodiments different methods of determining how many labels to include in the multi-label cluster 210 and how to order the labels may be used.

One or more stems may also be displayed on the map, wherein each stem is a UI element that corresponds to one of the labels in the multi-label cluster 210. For example, on the map 200, a first stem 218 connects the icon cluster 202 to the first label 212, a second stem 220 connects the icon cluster 202 to the second label 214 and a third stem 222 connects the icon cluster 202 to the third label 216.

Figure 2B:
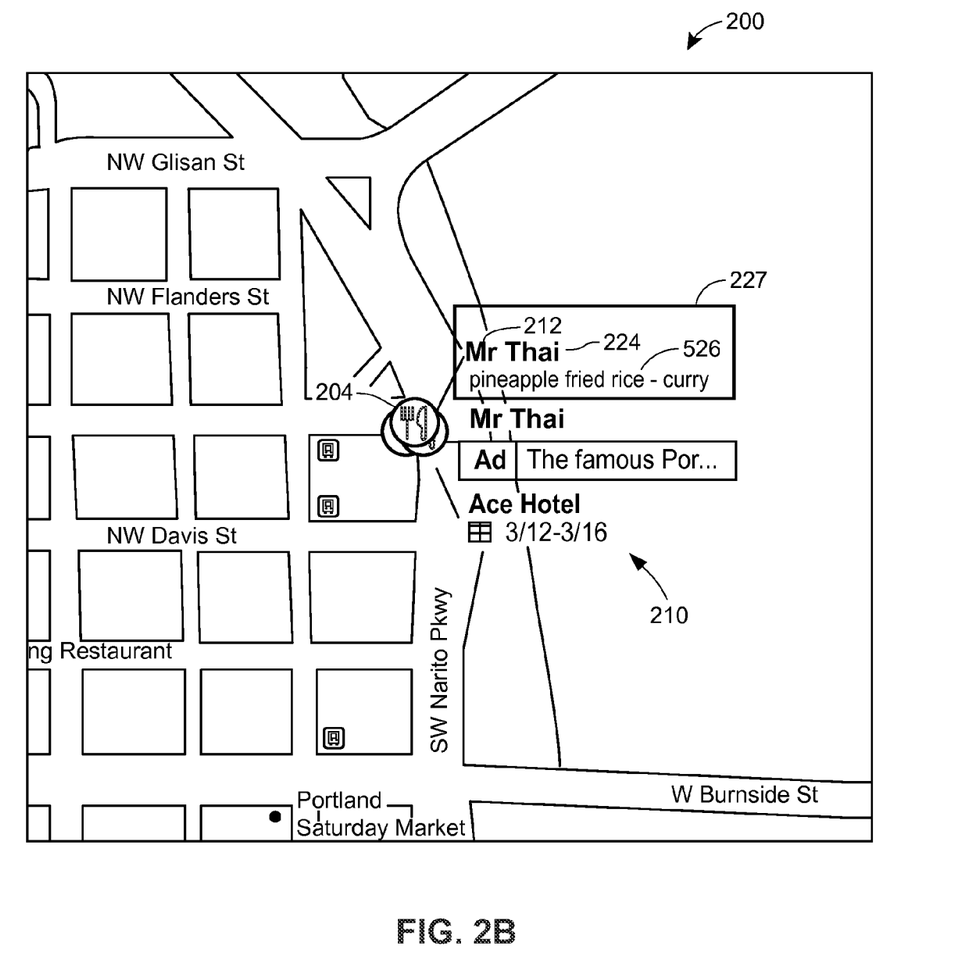

Turning now to FIG. 2B, the map 200 illustrates an embodiment of the display in which a hover event has occurred over the first label 212 in the multi-label cluster 210. The hover event may be detected, for example, by a processor executing the method 512 described below in reference to FIG. 5B. In some embodiments, the hover event may occur over a different visual indicator on the map 200, such as one of the icons in the icon cluster, one of the stems or some other visible or non-visible data represented on the map 200.

In FIG. 2B, once the hover event has occurred over the first label 212, a processor may execute an instruction to highlight the first label 212 may be highlighted, for example with a block 227 and processor may also execute an instruction to define the first icon 204 as a selectable target for that POI. In some embodiments one or more alternate or additional visual indicators associated with a POI may be highlighted and/or may become a selectable target as a result of the hover event. For example, in some embodiments, a hover event over the first label 212 will cause the first label 212 to be highlighted and the first label 212 may become as selectable target for the POI. In some embodiments, the label and/or stem corresponding to the POI may also be displayed with a background color if the highlighted label is determined to be sufficiently important. For example, a highlighted label may be determined to be "sufficiently important" if it is a hotel where the user has a reservation. In other embodiments, there may be one or more additional or alternate criteria used to determine if a highlighted point is sufficiently important.

Figure 2C:
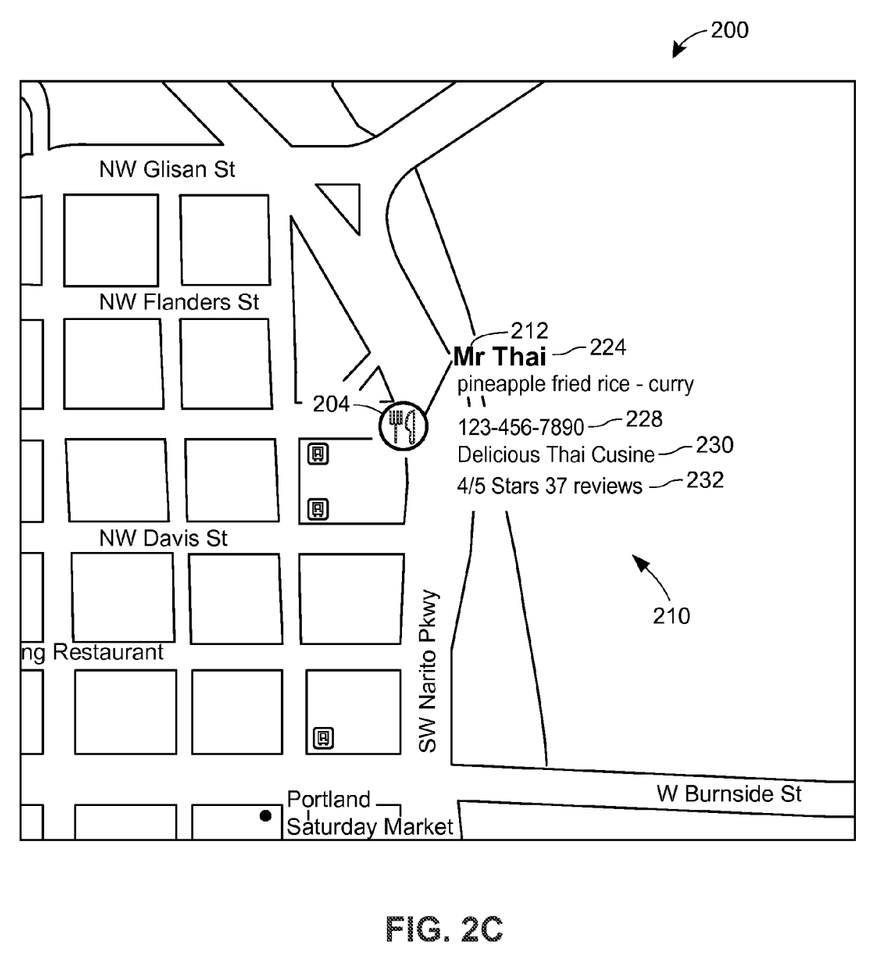

Turning now to FIG. 2C, a processor of the computing device 106 executing the instruction may detect a selection input of the first icon 204 displayed on the map 200. The first icon 204 may be selected by a user input, for example, a user using a mouse, touch screen, stylus, keyboard, etc. After detecting the selection input of the first icon 204, the processor of the computing device 106 may execute an instruction to expand the first label 212 corresponding to the first icon 204 and display more detail. The processor may also execute an instruction to hide the other labels in the multi-label cluster 210 on the map 200. The processor may also execute an instruction to increase the size of one or more visual indicators (icon, marker, label, stem, etc.) on the map 200. For example, in FIG. 2B, the first label 212 of the multi-label cluster 210 includes the name 224 of the POI and a brief description 226. However, after the computing device detects the selection input of the first label 212 the processor may execute an instruction to display, a phone number 228, a second description 230 and/or a rating 232 corresponding to the POI. In some embodiments the processor may also execute an instruction to display other types of information.

Figure 3:
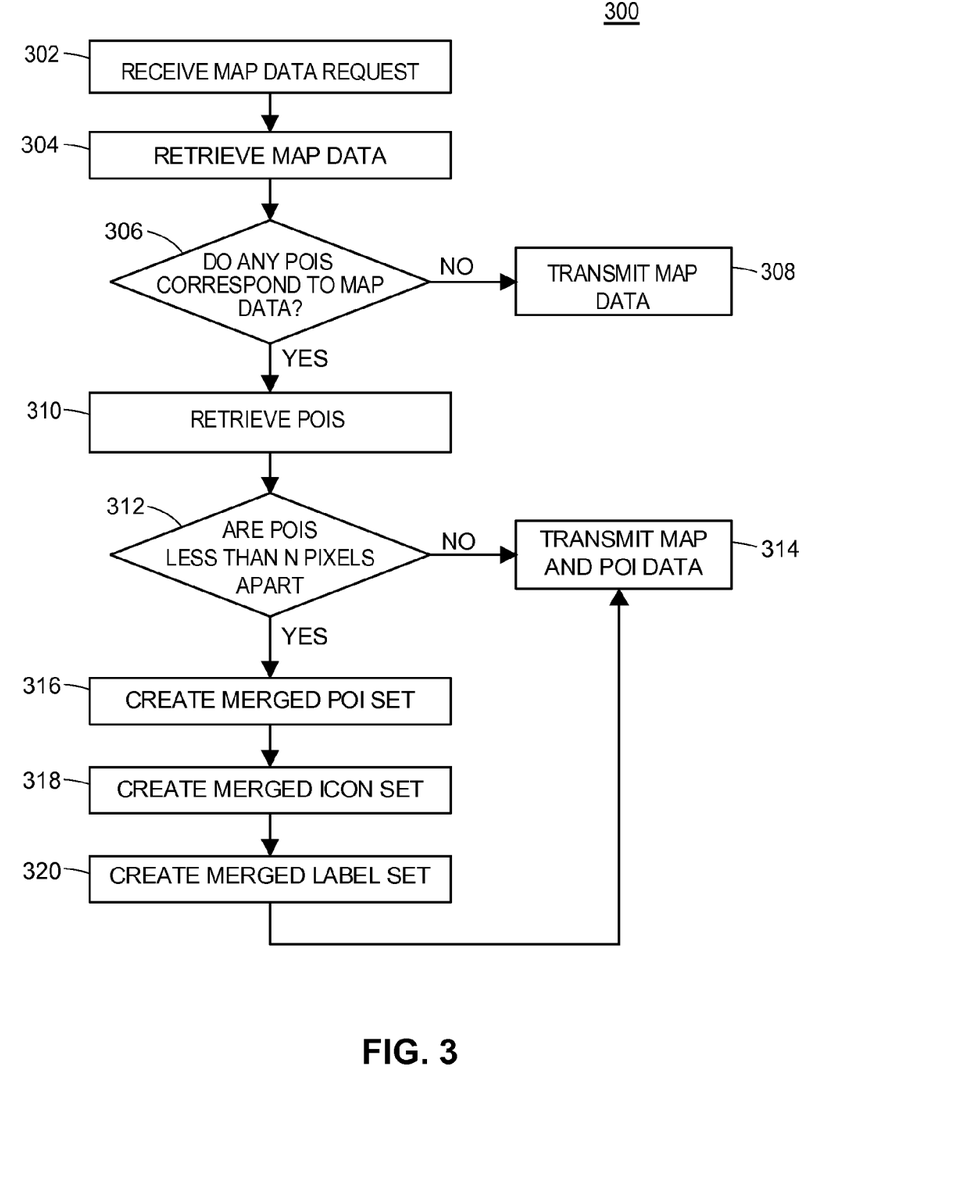
FIG. 3 depicts an exemplary flow chart depicting a method to create a merged POI set for multiple points of interest within a defined distance from one another in a mapping system according to an embodiment described herein.

Turning now to FIG. 3, a flow chart depicts an exemplary method 300 for creating an on-map multi-label cluster depicting multiple points of interest within a defined distance from one another. A computing device, such as the computing device 106 illustrated in FIG. 1. may transmit a map data request to a server device, such as the mapping server 116 illustrated in FIG. 1 In some embodiments, the map data request may include location data, such as GPS coordinates, account preference data, and/or other data. The mapping server 116 may receive the map data request (block 302) and the processor of the mapping server may execute an instruction to retrieve map data corresponding to the map data request (block 304). The map data may be retrieved from one or more databases, such as the map database 118 illustrated in FIG. 1.

The processor of the client device 106 may execute an instruction to determine if one or more points of interest (POI) data 120a correspond to the map data 118a (block 306). The processor of the computing device 106 may use one or more criteria for determining if the one or more POI data 120a correspond to the map data 120a. In some embodiments the processor executing the instruction may determine that one or more POI data 120a correspond to the map data 120a based on the geographical location. In some embodiments, the processor of the computing device 106a may additionally or alternatively consider account preference data, that may also be included in the map data request, to determine if one or more points of interest data 120a correspond to the map data 120a. In some embodiments, processor of the computing device 106 may use other techniques and/or criteria to determine if any points of interest data 120a correspond to the map data 118a and/or map request data.

If the processor of the computing device 106 determines that no POI data 120a correspond to the map data 120a (NO branch of block 306), then the data system may transmit the map data (block 308) to the client device 106. If the processor of the mapping server 116 determines that one or more POI data 120a correspond to the map data 118a (YES branch of block 306), then the mapping server 116 may retrieve the one or more POI data 120a (block 310). The mapping server 116 may retrieve the POI data 120a from one or more databases, such as the POI database 120 illustrated in FIG. 1. Each POI data 120a in the POI database 120 may also include one or more data defining information corresponding to the POI. For example, the data may define a name of the POI, a location, a description, a phone number, an icon, a label, etc. In some embodiments, a computing device, such as the computing device 106 illustrated in FIG. 1 may execute an instruction to use the data to create an icon and/or label for the POI when the POI is displayed within a viewport of a mapping application 104a.

If the processor executing the instruction retrieves more than one POI data 120a from the POI database 120, the processor of the mapping system 116 may also execute an instruction to determine whether the one or more POIs are within a defined distance from one another (block 312). In some embodiments, the processor may execute an instruction that applies a distance filter to the POI data 120a and determines whether the one or more POI data 120a are less than N pixels apart, wherein N is a number of pixels. In some embodiments the instruction executed by the processor may use other suitable techniques.

If the processor of the mapping server 116 executing the instruction determines that no POI data 120a is within the defined distance from one another (NO branch of block 312), the mapping server 116 may execute an instruction to transmit response data including the map data 118a and POI data 120a to the computing device 106 (block 314). If processor of the mapping server 116 executing the instruction determines that one or more POI data 120a are within the defined distance from one another (YES branch of block 312), the processor may execute an instruction to create a merged POI set (block 316). The data system may also create an icon cluster 202 (block 318) and/or a merged label set (block 320), such as a multi-label cluster 220, for the merged POI set. The processor of mapping system 116 may also execute an instruction to create the icon cluster 202 and/or the multi-label cluster 120 using the POI data 120a from the POI database 120. In some embodiments, the processor may also execute an instruction to flag the one or more POI data 120a in the merged POI set, to indicate that the one or more POI data 120a are rendered as a single point or an icon cluster 202 when displayed within a viewport of mapping application 104a executed on a computing device 106. Each POI data 120a in the merged POI set may correspond to at least one icon and/or label and may provide the name of the POI and/or other information, such as a description of the POI. The processor of the mapping system may also execute an instruction to transmit response data including the map data 118a, merged POI set, icon cluster 202 and multi-label cluster 220 (block 314) to the computing device 106. The processor of the computing device 106 may also execute an instruction to display the merged POI set, icon cluster 202 and multi-label cluster 220 within a viewport of a mapping application 104a running on the client computing device 106.

Figure 4:
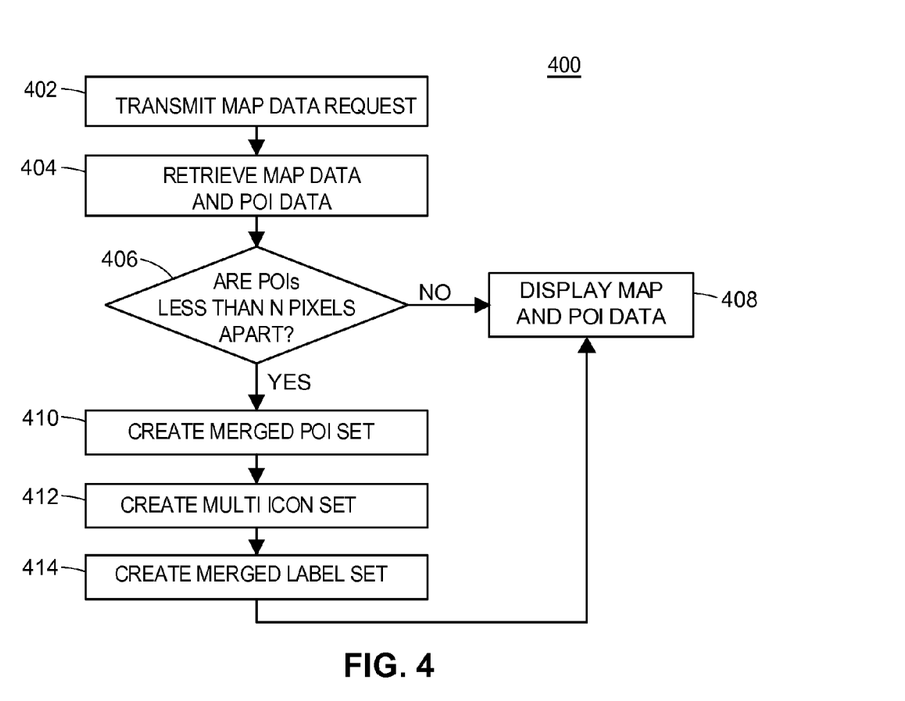
FIG. 4 depicts an exemplary flow chart depicting another method to create a merged POI set for multiple points of interest within a defined distance of one another in a mapping system according to an embodiment described herein.

Turning now to FIG. 4, a flow chart depicts an exemplary method 400 for creating a multi-line cluster 210 depicting multiple points of interest within a certain distance from one another. A computing device, such as the client computing device 106 illustrated in FIG. 1, may transmit a map data request (block 402) to a server device, such as the server device 116 illustrated in FIG. 1. In various embodiments, the map data request may include location data, such as GPS coordinates and/or other data. The mapping server 116 may execute an instruction to transmit a response to the request including map data 118a and POI data 120a corresponding to the map data request (block 404). In some embodiments, the received map data may be sent by a mapping server 116, (according to, for example, the method 300 illustrated in FIG. 3). The mapping server may retrieve the map data 118a, from one or more databases, such as the map database 118 illustrated in FIG. 1. The POI data 120a may also include one or more POI data corresponding to the map data 120a and/or map data request.

The processor of the computing device 106 may execute an instruction to determine if more than one POI is included in the POI data 120a, and if the processor determines that two or more POIs are in the POI data 120a, the processor 106 may also execute an instruction to determine whether one or more of the POIs are within a defined distance from one another (block 406). In some embodiments, the processor of the computing device 106 may execute an instruction to determine the defined distance by implementing a distance filter to determine whether one or more points of interest are less than N pixels apart, wherein N is a number of pixels. In some embodiments, other suitable measurement techniques may be used.

If the processor executing the instruction determines that no POIs are within the defined distance from one another (NO branch of block 406), the processor may execute an instruction to display the map data 118a and POI data 120a within a viewport of a mapping application 104a running on the computing device 106 (block 408). If the processor executing the instruction determines that one or more POI data 120a are within the defined distance from each other (YES branch of block 406), the processor may execute an instruction to create a merged POI set (block 410). The processor may also execute an instruction 106 to create a icon cluster 102 with one icon for each POI (block 412). In some embodiments the icon cluster may be a single point.

The processor of the computing device 106 may also execute an instruction to create a multi-label cluster 210 (block 414), that includes one or more labels for each POI. The processor may display the map data 118a and POI data 120a within a viewport of the mapping application 104a executed on the computing device 106 (block 408). For example, each POI may have at least one icon and/or label which may provide the name of the POI and other information such as a brief description.

Figure 5A:
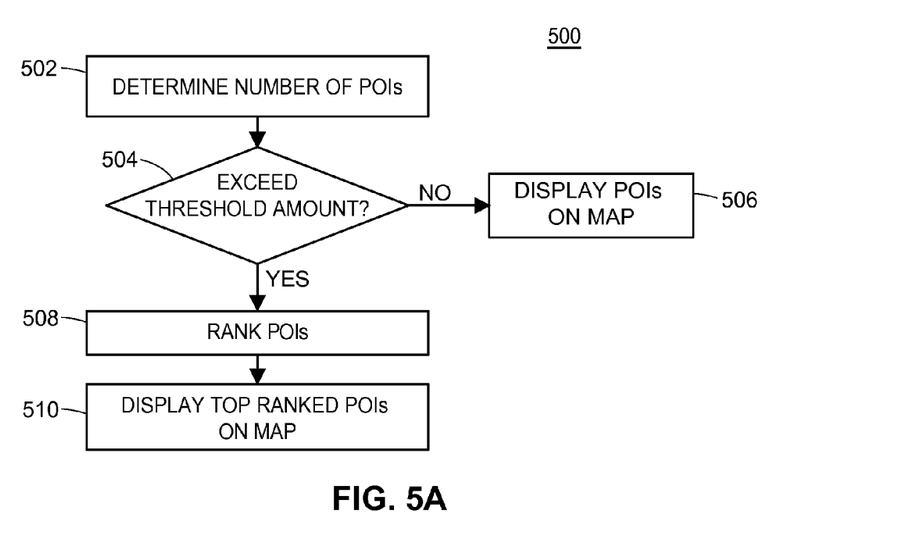
FIG. 5A depicts an exemplary flow chart depicting a method to determine points of interest to display on a map in a mapping system according to an embodiment described herein.

Turning now to FIG. 5A, a flow chart depicts an exemplary method 500 for determining which points of interest to display. A processor of a computing device, such as the computing device 106 and/or a server device, such as the mapping sever 116 may execute an instruction to determine the number of POIs in the merged POI set (block 502). The processor may also execute an instruction to determine if the number of POIs exceeds a threshold amount (block 504). In some embodiments the threshold amount may be three, though any number of POIs can be used. In some embodiments, the instruction may determine the threshold amount based on the size of the display of the computing device 106 which will display the merged POI set, the number of pixels on the display of the computing device 106, the display density, etc. Alternatively or additionally, other criteria and/or techniques may be used or the threshold amount may be arbitrary.

If the processor executing the instruction determines that number of POIs in the merged POI data set does not exceed the threshold amount (NO branch of block 504), then the processor may execute an instruction to display the POIs within a viewport of the mapping application 104a executed on the computing device 106 (block 506). If the processor executing the instruction determines that the number of POIs in the merged POI data set exceeds the threshold amount (YES branch of block 504), the mapping server 116 may rank the POIs (block 508). The POIs may be ranked based on one or more criteria such as location, rating or any other suitable technique. In some embodiments, a POI ranking may be stored in a data repository, such as the POI database 120 illustrated in FIG. 1. For example, if the threshold amount is 3, then the processor executing the application may select the top 3 ranking POIs for display on the map. In some embodiments, one or more techniques or criteria may be used to determine how many POIs should be displayed on the map. The processor may also execute an instruction to display the one or more top ranked POIs on-map rendered by a mapping application (block 510).

Figure 5B:
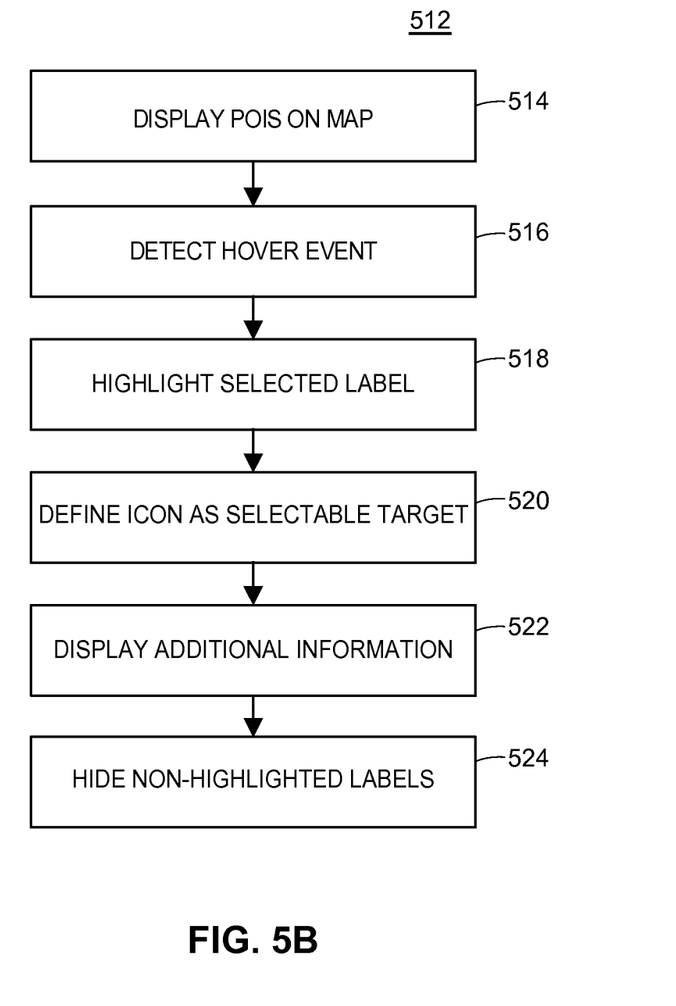
FIG. 5B depicts an exemplary flow chart depicting a method to highlight a selected label in response to detecting a hover event on a map in a mapping system according to an embodiment described herein.

Turning now to FIG. 5B, a flow chart depicts an exemplary method 512 for highlighting a selected label in response to detecting a hover event. The processor may execute an instruction to display a merged POI set within a viewport of a mapping application 104a executed on a computing device 106 (block 514). The processor of the computing device 106 may execute an instruction to render the merged POI set as a single icon on the map or as an icon cluster 202, with one icon rendered for each POI in the merged set. Additionally, the processor may execute an instruction to render a multi-label cluster 210 on the map and render one label for each POI in the merged set. The processor may also render one or more stems, each stem attaching the icon cluster 202a to the multi-label cluster 210. In some embodiments, the processor may render one or more additional visual indicators on the map for each POI in the merged POI set. The processor may execute an instruction to render the icons, labels and/or any visual representations associated with each POI in the merged POI set as a layer on the map 200, as a label on a map 200, or the processor may render them directly on the map 200, etc.

The processor of the computing device 106 executing the instruction may detect a hover event occurring over one of the labels in the multi-label cluster 210 (block 516). A hover event may occur when a user moves a mouse cursor over one of the labels included in the multi-label cluster, clicks and holds a mouse button when a mouse cursor is hovering over one of the labels included in the multi-label cluster 210, hovers a stylus over one of the labels included in the multi-label cluster 210, touches and holds one of the labels included in the multi-label cluster 210 with a finger on a touch screen device, looks at one of the labels included in the multi-label cluster 210 without making a selection input (using an eye tracking device, retina scanner, etc.), makes a voice command or performs another action that allows a user to "hover" or move over one of the labels included in the multi-label cluster 210 without making a selection input. In some embodiments, the hover event may occur over a different visual indicator on the map 200, such as one of the icons in the icon cluster 202, one of the stems or another indicator rendered by the mapping application 104a on the map 200.

In response to detecting the hover event occurring over one of the labels corresponding to one of the POIs in the POI cluster, the processor may execute an instruction to highlight the label may be highlighted (block 518) and define the icon in the icon cluster 202 corresponding to the POI as a selectable target (block 520). If the processor executing the instruction receives an input indicating that the icon has been selected, the processor may execute an instruction to display additional information (block 522) and hide the other non-highlighted labels in the multi-label cluster (block 524). Example information which may be displayed when the selection input is received include a phone number associated with the POI, a description of the POI and a rating corresponding to the POI. Of course in some embodiments other types of information may be displayed when an icon is selected.

Figure 6:
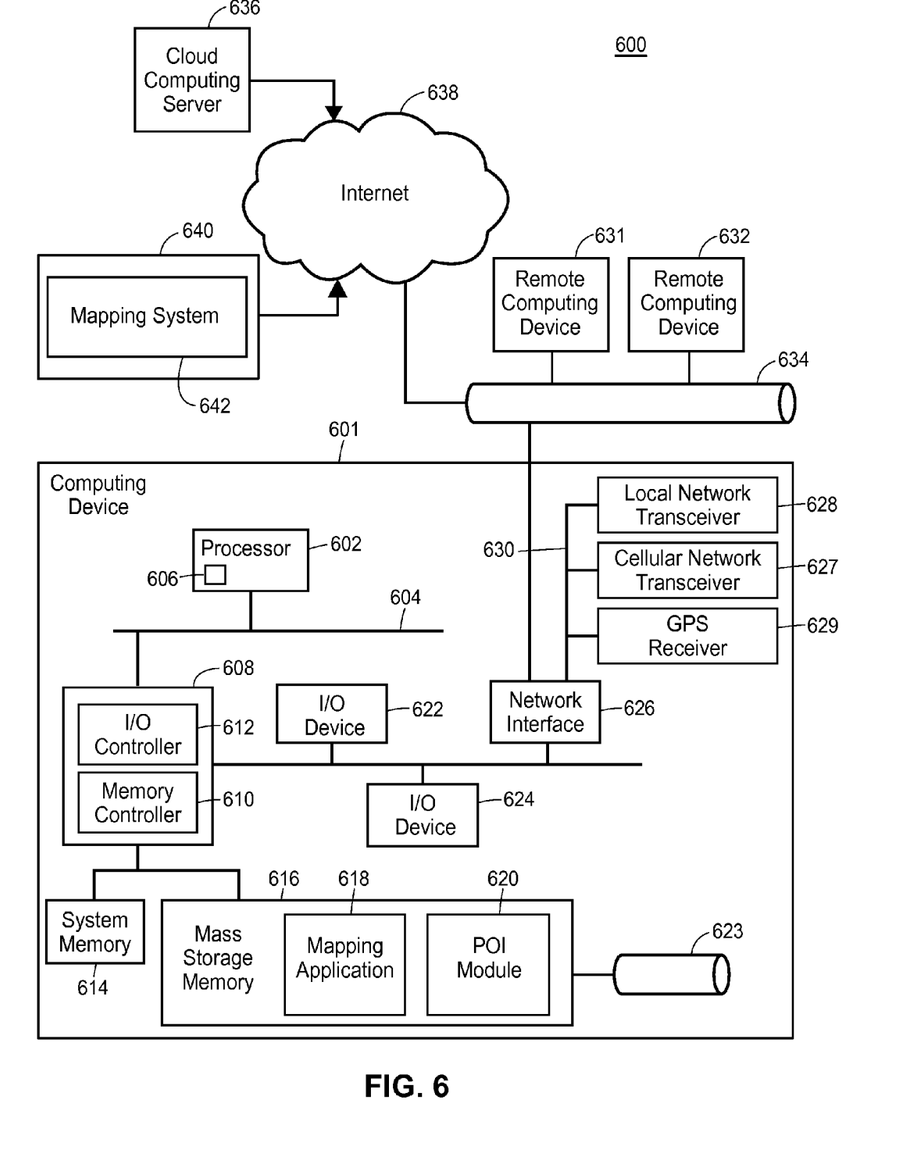
FIG. 6 is a high-level block diagram of a computing environment that implements a system and method for presenting multiple map results with on-map labels.

FIG. 6 is a high-level block diagram of an example computing environment for a mobile mapping system 600 having a computing device 601 that may be used to implement the system for presenting multiple map results with on-map labels. The computing device 601 may include a mobile device (e.g., a cellular phone, a tablet computer, a smart watch, a head mounted display, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 600 may be used to implement and execute the example system of FIG. 1, the methods of FIGS. 2, 3, 4A, 4B, etc. Although the example mobile mapping system 600 is described below as including a plurality of peripherals, interfaces, chips, memories, etc., one or more of those elements may be omitted and other processor systems may be used to implement and execute the example system 600 to present multiple map results with on-map labels. Also, other components may be added.

As shown in FIG. 6, the computing device 601 includes a processor 602 that is coupled to an interconnection bus 604. The processor 602 includes a register set or register space 606, which FIG. 6 depicts as being entirely on-chip, but which could alternatively be located entirely or partially off-chip and directly coupled to the processor 602 via dedicated electrical connections and/or via the interconnection bus 604. The processor 602 may be any suitable processor, processing unit or microprocessor. Although not shown in FIG. 6, the computing device 601 may be a multi-processor device and, thus, may include one or more additional processors that are identical or similar to the processor 602 and that are communicatively coupled to the interconnection bus 604.

The processor 602 of FIG. 6 is coupled to a chipset 608, which includes a memory controller 610 and a peripheral input/output (I/O) controller 612. As is well known, a chipset typically provides I/O and memory management functions as well as a plurality of general purpose and/or special purpose registers, timers, etc. that are accessible or used by one or more processors coupled to the chipset 608. The memory controller 610 performs functions that enable the processor 602 (or processors if there are multiple processors) to access a system memory 614 and a mass storage memory 616.

The system memory 614 may include any desired type of volatile and/or non-volatile memory such as, for example, static random access memory (SRAM), dynamic random access memory (DRAM), flash memory, read-only memory (ROM), etc. The mass storage memory 616 may include any desired type of mass storage device. For example, if the computing device 601 is used to implement a mapping application 618 having a POI module 620, (including instructions as described by the method 200 of FIG. 2, method 300 of FIG. 3, method 400 of FIG. 4A and method 412 of FIG. 4B), the mass storage memory 616 may include a hard disk drive, an optical drive, a tape storage device, a solid-state memory (e.g., a flash memory, a RAM memory, etc.), a magnetic memory (e.g., a hard drive), or any other memory suitable for mass storage.

As used herein, the terms module, block, function, operation, procedure, routine, step, and method refer to tangible computer program logic or tangible computer executable instructions that provide the specified functionality to the computing device 601 and the mobile mapping system 600. Thus, a module, block, function, operation, procedure, routine, step, and method can be implemented in hardware, firmware, and/or software. In one embodiment, program modules and routines (e.g., the mapping application 618, the POI module 620, etc.) are stored in mass storage memory 616, loaded into system memory 614, and executed by a processor 602 or can be provided from computer program products that are stored in tangible computer-readable storage mediums (e.g. RAM, hard disk, optical/magnetic media, etc.). Mass storage 616 may also include a database 623 storing GPS data, POI data, graphics, map data, and other data for use by the mapping application 618, POI module 620, as well as a database interface module through which the mapping application 618, the POI module 620, etc., may access the GPS data, graphics, etc.

The peripheral I/O controller 612 performs functions that enable the processor 602 to communicate with peripheral input/output (I/O) devices 622 and 624, a network interface 626, a cellular network transceiver 627, a local network transceiver 628, and a GPS receiver 629 (via the network interface 626) via a peripheral I/O bus 630. The I/O devices 622 and 624 may be any desired type of I/O device such as, for example, a keyboard, a display (e.g., a liquid crystal display (LCD), a cathode ray tube (CRT) display, etc.), a navigation device (e.g., a mouse, a trackball, a capacitive or other type of touch pad, a joystick, a touch screen, an eye tracker, a voice recognition module, etc.), etc. The I/O devices 622 and 624 may be used with the mapping application 618 and the POI module 620 to receive GPS data from the GPS receiver 629, send the GPS data to the backend components of the system 100 via the internet 638, render, and display maps and user interfaces as described in relation to the figures. A cellular network transceiver 627 may be resident with the local network transceiver 628. The local network transceiver 628 may include support for a Wi-Fi network, Bluetooth, Infrared, or other wireless data transmission protocols. In other embodiments, one element may simultaneously support each of the various wireless protocols employed by the computing device 601. For example, a software-defined radio may be able to support multiple protocols via downloadable instructions.

In operation, the computing device 601 may be able to periodically poll for visible wireless network transmitters (both cellular and local network) on a periodic basis. Such polling may be possible even while normal wireless traffic is being supported on the computing device 601. The network interface 626 may be, for example, an Ethernet device, an asynchronous transfer mode (ATM) device, an 802.11 wireless interface device, a DSL modem, a cable modem, a cellular modem, etc., that enables the system 100 to retrieve map data and POI data to communicate with another computer system having at least the elements described in relation to the system 600.

While the memory controller 610 and the I/O controller 612 are depicted in FIG. 6 as separate functional blocks within the chipset 608, the functions performed by these blocks may be integrated within a single integrated circuit or may be implemented using two or more separate integrated circuits. The mobile mapping system 600 may also implement the mapping application 618, and the POI module 620 on remote computing devices 631 and 632. The remote computing devices 631 and 632 may communicate with the computing device 601 over a network link 634. For example, the computing device 601 may receive map data created by a mapping application executing on a remote computing device 631, 632. In some embodiments, the mapping application 618 and/or the POI module 620 may be retrieved by the computing device 601 from a cloud computing server 636 via the Internet 638. When using the cloud computing server 636, the retrieved mapping application 618 and/or the POI module 620 may be programmatically linked with the computing device 601. The mapping application 618 and/or the POI module 620 may be a Java® applet executing within a Java® Virtual Machine (JVM) environment resident in the computing device 601 or the remote computing devices 631, 632. The mapping application 618 and/or the POI module 620 may also be "plug-ins" adapted to execute in a web-browser located on the computing devices 601, 631, and 632. In some embodiments, the mapping application 618 and/or the POI module 620 may communicate with back end components 640 such as the mapping system 142 via the Internet 638.

Using the systems and procedures described above, the system for presenting multiple map results with on-map labels 100 and mapping system 600 can retrieve and analyze data from a computing device that indicates a geographic location. For Internet-based device preferences, a browser history or other data may be parsed to determine device preferences. Similarly, local application data indicating trip planning or other location-based activities may be stored at the mobile device, forwarded to a mapping system or other system, and used by the mapping system to provide locations for relevant POI data. Of course, the systems described herein may present a user with a user interface from which the user is able to opt-out of any of the pre-fetching methods described herein.

The methods described herein may include one or more blocks, modules, functions or routines in the form of computer-executable instructions that are stored in a tangible computer-readable medium and executed using a processor of a computing device (e.g., a smart phone, a smart watch, a head mounted display, tablet computer, or a mobile computing device, or other personal computing device, as described herein). The methods may be included as part of any backend 111 or client mobile computing device 106 modules of a computing environment for a system 100 for presenting multiple map results with on-map labels, for example, or as part of a module that is external to such a system. For example, the methods may be part of a mapping module 117, POI module 122, POI module 108, mapping module 104, etc. executing within an application on a computing device of a system 100 for presenting multiple map results with on-map labels. Though the methods may be described with reference to the figures for ease of explanation, the methods can be utilized with other objects and user interfaces. Furthermore, although the explanation may describe the steps being performed by specific devices (such as a client computing device 106 of mapping server 116), this is done for illustration purposes only, and the blocks of the methods may be performed by one or more devices or other parts of the system 100.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the system 600 may include but is not limited to any combination of a LAN, a MAN, a WAN, a mobile, a wired or wireless network, a private network, or a virtual private network. Moreover, while only two remote computing devices 631 and 632 are illustrated in FIG. 6 to simplify and clarify the description, it is understood that any number of client computers are supported and can be in communication within the system 600.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system and a process for presenting multiple map results with on-map labels for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for presenting multiple map results with on-map labels. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for displaying points of interest (POIs) within a map that is displayed on a client computing device, the method comprising:
   transmitting to a server device, via a computer network, a request for map data;
   receiving, from the server device in response to the request, map data corresponding to the request and point of interest (POI) data related to the request;
   filtering, with the client computing device, POIs in the POI data to determine one or more sets of POIs wherein each POI in any set of POIs is within a predetermined distance from the other POIs in the set of POIs;
   creating with the client computing device, for each set of POIs, a merged icon for the set of POIs, the merged icon comprising a collection of layered icons, wherein at least a portion of the collection of layered icons is displayed on top of at least another portion of the collection of layered icons within the merged icon;
   creating with the client computing device, for each set of POIs, a merged, multi-line label for the set of POIs, the merged, multi-line label comprising a collection of labels, wherein each label is associated with a corresponding one POI in the set of POIs;
   displaying on a map generated from the received map data, for each set of POIs, the merged icon adjacent to the merged, multi-line label; and
   when a label of the collection of labels or a portion of the collection of layered icons is selected, hiding on the map the labels of the collection of labels which do not correspond to the POI associated with the selection.

2. The method of claim 1, wherein the POI data include, for each of a plurality of POIs to be displayed, a ranking of the POI and a label associated with the POI.

3. The method of claim 2, further comprising:
   determining, at the client computing device, that the set of POIs contains more than three POIs;
   selecting, as the plurality of POIs to be displayed, the three POIs with the highest rankings in each set of POIs; and
   displaying only the plurality of POIs.

4. The method of claim 1, wherein the merged icon is a single icon.

5. The method of claim 1, wherein one of the POIs in the set of POIs includes an advertisement.

6. The method of claim 1, further comprising bringing a representative portion of the collection of layered icons to the forefront of the merged icon when a hover event occurs over a corresponding label of the collection of labels in the merged, multi-line label.

7. The method of claim 6, further comprising highlighting the label of the merged, multi-line label when a hover event occurs over the label of the merged, multi-line label.

8. The method of claim 7, further comprising causing the merged, multi-line label to be replaced with label information specific to the POI corresponding to the selected label of the merged, multi-line label when the label of the merged, multi-line label is selected.

9. A computer-implemented method for determining points of interest (POIs) within a map to be displayed on a client computing device, the method comprising:
   receiving, via a computer network, a request for map data;
   determining, at a server device, that one or more points of interest correspond to the map data request;
   retrieving, from a database, map data corresponding to the request and point of interest (POI) data relating to the request;
   filtering, with the server device, POIs in the POI data to determine one or more sets of POIs wherein each POI in any set of POIs is within a predetermined distance from the other POIs in the set of POIs;
   creating within the server device, for each set of POIs, a merged icon for the set of POIs, the merged icon comprising a collection of layered icons, wherein at least a portion of the collection of layered icons is displayed on top of at least another portion of the collection of layered icons within the merged icon;
   creating within the server device, for each set of POIs, a merged, multi-line label for the set of POIs, the merged, multi-line label comprising a collection of labels, wherein each label is associated with a corresponding one POI in the set of POIs;
   transferring to the client device the retrieved map data and POI data, the merged icon, and the merged, multi-line label; and
   when a label of the collection of labels or a portion of the collection of layered icons is selected, causing the labels of the collection of labels to be hidden which do not correspond to the POI associated with the selection.

10. The method of claim 9, wherein receiving POI data related to the request comprises receiving, for each of a plurality of POIs to be displayed, a ranking of the POI and a label associated with the POI.

11. The method of claim 10, further comprising:
    determining, at the server device, that the set of POIs contains more than three POIs; and
    selecting, as the plurality of POIs to be displayed, the three POIs with the highest rankings in each set of POIs.

12. The method of claim 9, wherein the merged icon is a single icon.

13. The method of claim 9, wherein one of the POIs in the set of POIs includes an advertisement.

14. A non-transitory computer-readable storage medium storing instructions, executable by a processor of a client device, for displaying on the client device points of interest (POIs) within a map, the instructions executable to cause the processor to:
    transmit to a server, via a computer network, a request for map data;
    receive, from the server in response to the request, map data corresponding to the request and POI data related to the request;
    filter POIs in the POI data to determine one or more sets of POIs wherein each POI in any set of POIs is within a predetermined distance from the other POIs in the set of POIs;
    create a merged icon for each set of POIs, the merged icon comprising a collection of layered icons, wherein at least a portion of the collection of layered icons is displayed on top of at least another portion of the collection of layered icons within the merged icon;

create a merged, multi-line label for each set of POIs, the merged, multi-line label comprising a collection of labels, wherein each label is associated with a corresponding one POI in the set of POIs;

display on a map generated from the received map data, for each set of POIs, the merged icon adjacent to the merged, multi-line label; and when a label of the collection of labels or a portion of the collection of layered icons is selected, hide on the map the labels of the collection of labels which do not correspond to the POI associated with the selection.

15. The computer-readable storage medium of claim 14, wherein receiving POI data related to request comprises receiving, for each of a plurality of POIs to be displayed, a ranking of the POI and a label associated with the POI.

16. The computer-readable storage medium of claim 15, further comprising instructions operable to cause the processor to:

determine that the set of POIs contains more than three POIs;

select, as the plurality of POIs to be displayed, the three POIs with the highest rankings in each set of POIs; and display only the plurality of POIs.

17. The computer-readable storage medium of claim 14, wherein the merged icon is a single icon.

18. The computer-readable storage medium of claim 14, wherein one of the POIs in the set of POIs includes an advertisement.

19. The computer-readable storage medium of claim 14, further comprising instructions operable to cause the processor to:

detect a hover event occurring over a corresponding label of the collection of labels in the merged, multi-line label; and bring to the foreground of the merged icon a representative portion of the collection of layered icons in response to detecting the hover event.

20. The computer-readable storage medium of claim 19, further comprising instructions operable to cause the processor to highlight the label of the merged, multi-line label when the hover event is detected.

21. The computer-readable storage medium of claim 20, further comprising instructions operable to cause the processor to:

detect when the label of the merged, multi-line label is selected; and in response to detecting the selection, cause the merged, multi-line label to be replaced with information specific to the POI corresponding to the selected label of the merged, multi-line label.

22. A non-transitory computer-readable storage medium storing instructions, executable by a processor of a server device, for displaying on the client device points of interest (POIs) within a map, the instructions executable to cause the processor to:

receive, via a computer network, a request for map data;

determine that one or more POIs correspond to the map data request;

retrieve, from one or more databases storing map data and POI data, map data corresponding to the request and POI data relating to the request, wherein the POI data include, for each POI, a ranking of the POI and a label associated with the POI;

filter POIs in the POI data to determine one or more sets of POIs wherein each POI in any set of POIs is within a predetermined distance from the other POIs in the set of POIs;

create, for each set of POIs, a merged icon for the set of POIs, the merged icon comprising a collection of layered icons, wherein at least a portion of the collection of layered icons is displayed on top of at least another portion of the collection of layered icons within the merged icon;

create, for each set of POIs, a merged, multi-line label, the merged, multi-line label comprising a collection of labels wherein each label is associated with a corresponding one POI in the set of POIs;

transfer to the client device the retrieved map data and POI data, the merged icon, and the merged, multi-line label; and when a label of the collection of labels or a portion of the collection of layered icons is selected, cause the labels of the collection of labels to be hidden which do not correspond to the POI associated with the selection.

23. The computer-readable storage medium of claim 22, wherein retrieving POI data related to request comprises retrieving, for each of a plurality of POIs to be displayed, a ranking of the POI and a label associated with the POI.

24. The computer-readable storage medium of claim 23, further comprising instructions operable to cause the processor to:

determine that the set of POIs contains more than three POIs; and select, as the plurality of POIs to be displayed, the three POIs with the highest rankings in each set of POIs.

25. The computer-readable storage medium of claim 22, wherein the merged icon is a single icon.

26. The computer-readable storage medium of claim 22, wherein one of the POIs in the set of POIs includes an advertisement.

* * * * *